United States Patent
Cooper et al.

(10) Patent No.: US 8,144,052 B2
(45) Date of Patent: Mar. 27, 2012

(54) MULTI-PIXEL HIGH-RESOLUTION THREE-DIMENSIONAL IMAGING RADAR

(75) Inventors: Ken B. Cooper, La Crescenta, CA (US); Robert J. Dengler, Walnut, CA (US); Peter H. Siegel, La Canada, CA (US); Goutam Chattopadhyay, Pasadena, CA (US); John S. Ward, Roanoke, IN (US); Nuria Llombart Juan, Alboraya (ES); Tomas E. Bryllert, Göteborg (SE); Imran Mehdi, South Pasadena, CA (US); Jan A. Tarsala, Arcadia, CA (US)

(73) Assignee: California Institute of Technology, Pasadena, CA (US)

( * ) Notice: Subject to any disclaimer, the term of this patent is extended or adjusted under 35 U.S.C. 154(b) by 336 days.

(21) Appl. No.: 12/580,210

(22) Filed: Oct. 15, 2009

(65) Prior Publication Data

US 2010/0090887 A1     Apr. 15, 2010

Related U.S. Application Data

(60) Provisional application No. 61/196,199, filed on Oct. 15, 2008.

(51) Int. Cl.
*G01S 13/89* (2006.01)
*G01C 3/08* (2006.01)

(52) U.S. Cl. ............ 342/179; 342/180; 342/22; 342/27; 342/188; 342/196; 356/456; 356/4.01

(58) Field of Classification Search ............ 342/179, 342/180, 22, 27, 52, 54, 188, 196; 356/327, 356/4.01, 456, 5.09, 5.15
See application file for complete search history.

(56) References Cited

U.S. PATENT DOCUMENTS

| 4,901,084 | A | * | 2/1990 | Huguenin et al. | 342/179 |
| 4,910,523 | A | * | 3/1990 | Huguenin et al. | 342/179 |
| 5,202,692 | A | * | 4/1993 | Huguenin et al. | 342/179 |
| 5,384,573 | A | * | 1/1995 | Turpin | 342/179 |
| 5,610,705 | A | * | 3/1997 | Brosnan et al. | 356/28.5 |
| 5,736,958 | A | * | 4/1998 | Turpin | 342/179 |
| 5,751,243 | A | * | 5/1998 | Turpin | 342/179 |
| 7,609,198 | B2 | * | 10/2009 | Chang | 342/59 |
| 7,687,773 | B2 | * | 3/2010 | Siegel et al. | 250/330 |

(Continued)

FOREIGN PATENT DOCUMENTS

FR      2608284 A1  *  6/1988
(Continued)

*Primary Examiner* — John Sotomayor
(74) *Attorney, Agent, or Firm* — Canady & Lortz LLP; Bradley K. Lortz (57) ABSTRACT

A three-dimensional imaging radar operating at high frequency e.g., 670 GHz radar using low phase-noise synthesizers and a fast chirper to generate a frequency-modulated continuous-wave (FMCW) waveform, is disclosed that operates with a multiplexed beam to obtain range information simultaneously on multiple pixels of a target. A source transmit beam may be divided by a hybrid coupler into multiple transmit beams multiplexed together and directed to be reflected off a target and return as a single receive beam which is demultiplexed and processed to reveal range information of separate pixels of the target associated with each transmit beam simultaneously. The multiple transmit beams may be developed with appropriate optics to be temporally and spatially differentiated before being directed to the target. Temporal differentiation corresponds to a different intermediate frequencies separating the range information of the multiple pixels. Collinear transmit beams having differentiated polarizations may also be implemented.

20 Claims, 9 Drawing Sheets

U.S. PATENT DOCUMENTS

| | | | |
|---|---|---|---|
| 7,746,450 B2* | 6/2010 | Willner et al. | 356/28 |
| 7,899,432 B2* | 3/2011 | Chattopadhyay et al. | 455/327 |
| 7,978,337 B2* | 7/2011 | de Groot et al. | 356/495 |
| 2006/0227316 A1* | 10/2006 | Gatt | 356/5.09 |
| 2007/0002327 A1* | 1/2007 | Zhou et al. | 356/456 |
| 2007/0024856 A1* | 2/2007 | Izatt et al. | 356/456 |
| 2008/0170225 A1* | 7/2008 | de Boer et al. | 356/327 |
| 2008/0304044 A1* | 12/2008 | Cooper et al. | 356/5.15 |
| 2009/0316160 A1* | 12/2009 | Izatt et al. | 356/456 |
| 2010/0090887 A1* | 4/2010 | Cooper et al. | 342/25 F |
| 2010/0094576 A1* | 4/2010 | De Boer et al. | 702/66 |
| 2011/0037965 A1* | 2/2011 | Hintz et al. | 356/4.01 |
| 2011/0134249 A1* | 6/2011 | Wood et al. | 348/164 |
| 2011/0210237 A1* | 9/2011 | Sternklar | 250/214.1 |

FOREIGN PATENT DOCUMENTS

| | | | |
|---|---|---|---|
| JP | 62250384 A | * | 10/1987 |
| JP | 63058185 A | * | 3/1988 |

* cited by examiner

MULTI-PIXEL HIGH-RESOLUTION THREE-DIMENSIONAL IMAGING RADAR

CROSS-REFERENCE TO RELATED APPLICATIONS

This application claims the benefit under 35 U.S.C. §119(e) of the following U.S. provisional patent application, which is incorporated by reference herein:

U.S. Provisional Patent Application No. 61/196,199, filed Oct. 15, 2008, and entitled "A TWO-PIXEL 670 GHZ IMAGING RADAR USING A SINGLE TX/RX MODULE", by Cooper et al.

This application is related to the following co-pending and co-owned application, which is incorporated by reference herein:

U.S. patent application Ser. No. 12/135,040, filed Jun. 6, 2008, and entitled "HIGH-RESOLUTION THREE-DIMENSIONAL IMAGING RADAR", by Cooper et al.

STATEMENT OF GOVERNMENT RIGHTS

The invention described herein was made in the performance of work under a NASA contract, and is subject to the provisions of Public Law 96-517 (35 U.S.C. 202) in which the Contractor has elected to retain title.

BACKGROUND OF THE INVENTION

1. Field of the Invention

This invention relates to imaging radar systems. Particularly, this invention relates to high frequency real aperture three-dimensional radar imaging systems.

2. Description of the Related Art

Numerous commercial technologies can detect weapons or contraband concealed in clothing on persons—from trace chemical sniffers to X-ray imagers—but in almost all cases these approaches require the sensor and the target to be in close proximity. For situations that call for remote detection, such as when hidden explosives may be detonated or where clandestine surveillance is warranted, concealed weapons detection is at best extremely difficult to accomplish.

Conventional radars are being widely investigated for this purpose, but stringent spatial resolution requirements make these systems impractical because of the large bandwidths and aperture sizes needed. Traditional radar systems are also poorly suited for spectroscopic identification of materials such as explosives. Some progress in through-clothing imaging has been reported using passive thermal detectors in the submillimeter spectrum, but these approaches are lacking in sensitivity and spectral selectivity.

Among the conventional detection systems employing radar techniques for human targets, many operate only by detecting power of a beam reflected off a target. Such radar detection systems infer a characteristic of the object reflecting power from a location compared against reflected power from other locations in a two-dimensional scan. Radar detection systems operating in this manner typically do not derive or utilize range information across the target object (the person). Thus, such radar systems operating based on reflected power alone are not three-dimensional imaging systems. In contrast, radar imaging systems employ derived range information to a target, typically ignoring reflected power. However, effective three-dimensional radar imaging systems can be difficult to produce. Imaging technology in the THz range has primarily focused on acquiring two-dimensional camera-like representations of a scene. However, additional utility would come from a fully three-dimensional imaging radar with high range resolution.

Recent progress in terahertz (THz) technology, as well as the demand for new surveillance capabilities, has led to the development of prototype submillimeter imagers capable of detecting weapons concealed within clothing or packages. See, e.g. McMillan, "Terahertz Imaging Millimeter-Wave Radar," Advances in Sensing with Security Applications Digest, NATO Advanced Study Institute, II Ciocco Italy, pp. 1-26, Jul. 17-30, 2005 (http://w.nato-asi.org/sensors2005/papers/mcmillan.pdf); Dengler, "Passive and Active Imaging of Humans for Contraband Detection at 610 GHz," 2004 IEEE MTT-S Intl. Microwave Sym. Digest, Ft. Worth, Tex., June 2004, pp. 1591-1594; Petkie et al., "Active and passive millimeter and sub-millimeter-wave imaging" Proc. SPIE, vol. 5989, pp. 598918-1 to 598918-8, 2005; Dickinson et al., "Terahertz imaging of subjects with concealed weapons," Proc. SPIE, vol. 6212, pp. 62120Q-1 to 62120Q-12, 2006; Kemp et al., "Security applications of terahertz technology," Proc. SPIE, vol. 5070, pp. 44-52.2003; and Dengler et al., "A Compact 600 GHz Electronically Tunable Vector Measurement System for Submillimeter Wave Imaging," 2006, IEEE MTT-S Intl. Microwave Symp. Digest, San Francisco, Calif., June 2006, pp. 1923-1926, which are all incorporated by reference herein. Imaging in the THz regime is attractive because wavelengths in the range 100 μm<λ<0.5 mm are short enough to provide high resolution with modest apertures and long enough to penetrate materials such as cloth or cardboard.

With the ability to penetrate clothing, the potential for cm-scale image resolution, and SNR in excess of $10^6$, it is no wonder that active (illuminated) submillimeter-wavelength imaging has attracted great interest for standoff weapons detection. However, substantial sensitivity and good resolution are insufficient to reliably detect concealed objects. Current approaches to THz imaging do not yet meet all of the real-world and often conflicting requirements of standoff range, portability, high speed, penetrability, target identification, and cost.

U.S. Pat. No. 7,345,279 by Mueller, issued Mar. 18, 2008 discloses a method for inspecting a package to identify an object concealed in the package includes passing two beams of THz-radiation through the package. The frequency of THz radiation in one beam is different from that in the other, and the beams are at an angle to each other. Each of the transmitted beams is used to form an image of the package and the object. The absorption coefficient of the object is determined from the two images. The material of the object is determined from the absorption coefficients at the two frequencies. The method is useful for detecting explosive material concealed in baggage.

U.S. Patent Publication No. 20060214107 by Mueller, published Sep. 28, 2008 discloses a THz-frequency heterodyne imaging method is used to remotely detect objects concealed in or under a person's clothing. One THz-frequency beam is scanned over a person being examined. A portion of the beam penetrates the persons clothing and is reflected by an object concealed under the person's clothing. The reflected portion the beam is mixed with another beam of THz-frequency radiation having a different frequency to provide a signal having an intermediate frequency (IF) including image data representative of the concealed object.

Mueller employs THz radiation is generated through optical pumping of a $CO_2$ laser, and a heterodyne detection technique is used to measure the reflected signal. Because of the ability for THz to penetrate clothing, Mueller speculates that hidden contraband can be detected based on the downconverted signal. Mueller also speculates that high-resolution radar techniques would assist in detecting hidden objects, and a frequency-modulated continuous-wave (FMCW) radar technique is proposed to accomplish that. However, no algorithmic description explaining how radar data is to be used for object detection is given, and no methods of FM-chirp nonlinearity compensation are described.

In real scenarios a coherent radar image will typically exhibit very poor contrast between a concealed object and the surrounding clothing and skin—even for hidden metallic objects such as guns. The challenge of actively illuminated submillimeter wave detection of concealed objects involves extracting signals from scene clutter rather than from noise. For example, while active THz imaging systems using high power coherent illumination and ultra-low-noise heterodyne detection show great promise, they often face operational drawbacks such as requiring cryogenic detectors or bulky laser sources. A more fundamental difficulty with coherent active imaging is that by relying on a single frequency, target recognition is reliant on an object's contrast and brightness which, in turn, are highly sensitive to incidence angle of radiation, clutter signal from the foreground or background, and interference and speckle effects.

In view of the foregoing, there is a need in the art for apparatuses and methods for high frequency radar providing three-dimensional imaging with high range resolution. There is also a need for such apparatuses and methods employing long standoff range, speed and penetrability. There is a need for such apparatuses and methods to operate with reduced sensitivity to incidence angle of radiation, clutter signal from the foreground or background, and interference and speckle effects, indicative of other imagers. There is further a need for such apparatuses and methods to operate allow conceal target identification at reasonable cost. There is particularly a need for such apparatuses and methods in security applications to detect concealed weapons and explosives on individuals. In addition, there is a need for such apparatuses and methods to operate at improved imaging rates, ideally facilitating full motion radar imaging. Particularly, there is a need for systems and methods that can yield multi-pixel radar imaging in order to achieve higher imaging rates. These and other needs are met by the present invention as detailed hereafter.

SUMMARY OF THE INVENTION

A three-dimensional imaging radar operating at high frequency e.g., 670 GHz radar using low phase-noise synthesizers and a fast chirper to generate a frequency-modulated continuous-wave (FMCW) waveform, is disclosed that operates with a multiplexed beam to obtain range information simultaneously on multiple pixels of a target. A source transmit beam may be divided by a hybrid coupler into multiple transmit beams multiplexed together and directed to be reflected off a target and return as a single receive beam which is demultiplexed and processed to reveal range information of separate pixels of the target associated with each transmit beam simultaneously. The multiple transmit beams may be developed with appropriate optics to be temporally and spatially differentiated before being directed to the target. Temporal differentiation corresponds to a different intermediate frequencies separating the range information of the multiple pixels. Collinear transmit beams having differentiated polarizations may also be implemented.

A typical embodiment of the invention comprises a radar imaging system, including a quasioptical device for dividing a source transmit beam into a first transmit beam and a second transmit beam and multiplexing them, where both the first transmit beam and the second transmit beam are directed to be reflected off a target such that the second transmit beam is time-delayed from the first transmit beam to correspond to a distinct IF frequency for demultiplexing and processing and received as a single multiplexed receive signal with the quasioptical device, and a system for signal mixing and a digital signal processor for performing fast Fourier transform (FFT) processing for demultiplexing and processing the single multiplexed receive signal to determine range information of the target for both a first pixel from the first transmit beam and a second pixel from the second transmit beam.

In some embodiments, the system for mixing may comprise a first wave synthesizer for generating the source transmit beam, the source transmit beam comprising a frequency modulated continuous wave (FMCW) chirp signal from a source signal, a second wave synthesizer for generating a FMCW local oscillator chirp signal from a source local oscillator signal, a first mixer for combining the reflected FMCW chirp signal and the FMCW local oscillator chirp signal to generate a first intermediate frequency (IF) signal for each of the first transmit beam and the second transmit beam, a second mixer for combining the source signal and the source local oscillator signal to generate a second IF signal, and a third mixer for combining the first IF signal and the second IF signal to generate a final IF signal for each of the first transmit beam and the second transmit beam. The digital signal processor may perform fast Fourier transform (FFT) processing of the final IF signal for each of the first transmit beam and the second transmit beam to determine range information for the target of both a first pixel from the first transmit beam and a second pixel from the second transmit beam. A waveform generator generating a common chirp signal in 1 millisecond or less may be employed, wherein the first wave synthesizer generates the frequency modulated continuous wave (FMCW) chirp signal from the source signal mixed with the common chirp signal and the second wave synthesizer generates the FMCW local oscillator chirp signal from the source local oscillator signal mixed with the common chirp signal.

In some embodiments, the quasioptical device spatially offsets the second transmit beam along a substantially parallel path from the first transmit beam to a distinct point on the target. The quasioptical device may also be designed to direct the first transmit beam and the second transmit beam along substantially collinear paths and polarize the second transmit beam to that of the first transmit beam to correspond to a distinct polarization for demultiplexing and processing.

In further embodiments of the invention, the quasioptical device may comprise a coupler for dividing the source transmit beam into the first transmit beam and the second transmit beam, a polarization twist waveguide for rotating polarization of the second transmit beam relative to that of the first transmit beam, and quasioptical components for imparting a path length differential to induce a time delay between the second transmit beam and the first transmit beam and for directing the first transmit beam and the second transmit beam to the target along a substantially parallel path with a spatial offset.

In some embodiments, a three dimensional map of the target may be derived from the range information determined for each of multiple pixels scanned over the target, where the range information for the multiple pixels are determined in simultaneously processed pairs associated with the first transmit beam and the second transmit beam. A peak-finding algorithm may be applied to the determined range information to differentiate material layers of the target. In addition, a scanning stage may employ in conjunction with the two transmit beams. For example, the quasioptical device may comprise a reflector coupled to a two-axis rotation stage and the range information is determined by positioning the two-axis rotation stage for each of the pairs of the multiple pixels scanned over the target with the reflector directing the FMCW chirp signal from the reflector to be reflected off the target and received from the target.

In a similar manner, a typical method of radar imaging, comprises dividing a source transmit beam into a first transmit beam and a second transmit beam and multiplexing them with a quasioptical device, directing both the first transmit beam and the second transmit beam to be reflected off a target such that the second transmit beam is time-delayed from the first transmit beam to correspond to a distinct IF frequency for demultiplexing and processing and received as a single multiplexed receive signal with the quasioptical device, and signal mixing and performing fast Fourier transform (FFT) processing for demultiplexing and processing the single multiplexed receive signal to determine range information of the target for both a first pixel from the first transmit beam and a second pixel from the second transmit beam with a signal system and a digital signal processor. Method embodiments of the invention may be further modified consistent with the apparatuses and systems described herein.

Embodiments of the invention may also encompass an apparatus for multiplexing in a radar imaging system, comprising a coupler for dividing the source transmit beam into a first transmit beam and a second transmit beam and multiplexing them, a polarization twist waveguide for rotating polarization of the second transmit beam relative to that of the first transmit beam, and quasioptical components for imparting a path length differential to induce a time delay between the second transmit beam and the first transmit beam and for directing the first transmit beam and the second transmit beam to the target along a substantially parallel path with a spatial offset. Both the first transmit beam and the second transmit beam are directed to be reflected off a target and received as a single multiplexed receive signal by the quasioptical device and the single multiplexed receive signal is demultiplexed and processed to determine range information of the target for both a first pixel from the first transmit beam and a second pixel from the second transmit beam. Typically, the source transmit beam comprises a frequency modulated continuous wave (FMCW) chirp signal. The apparatus for multiplexing in a radar imaging system may be further modified consistent with the other apparatuses and methods described herein.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

Previously an imaging radar was described that operates at submillimeter wavelengths for applications ranging from concealed weapons detection to planetary trace-chemical identification in U.S. patent application Ser. No. 12/135,040, filed Jun. 6, 2008, and entitled "HIGH-RESOLUTION THREE-DIMENSIONAL IMAGING RADAR", by Cooper et al., which is incorporated by reference herein. Unlike conventional radars, which typically operate below 100 GHz (i.e., wavelengths greater than approximately 3 mm), such a system operating well above this, e.g., 670 GHz, is capable of very high imaging resolution in three dimensions because since its high modulation bandwidth gives higher range resolution and its shorter wavelength gives higher lateral image resolution for any fixed antenna aperture size. Using a novel signal generation architecture, the submillimeter radar is capable of quickly, quietly, and linearly frequency-sweep over a bandwidth of 18 GHz, thus permitting an ultra-high range resolution of less than 1 cm. With an aperture size of 50 cm, the radar is also able to resolve targets within 2 cm at stand-off distances of 25 m. In addition, the submillimeter radar is novel because it has the potential to acquire spectroscopic information from targets for distinguishing their materials characteristics or chemical composition. Finally, owing to its all solid-state implementation, this technology is scalable to a fast, compact multipixel imaging system capable of three-dimensional imaging.

However, the previously disclosed three-dimensional radar imaging system is described using only a scanning stage to repoint the radar in order to obtain range information of the different pixels across the target. The imaging speed of such a system may be improved adapting it to simultaneous multi-pixel imaging. However, there is no demonstrated previously technique for forming large multi-pixel heterodyne imagers an any wavelength above 100 GHz due to the complexity of having to deal with three different signals for each detector, the local oscillator (LO), radio frequency (RF), and intermediate frequency (IF). In order to increase the number of pixels that are imaged simultaneously using the existing scanning approach, the transmit (Tx) and receive (Rx) modules would need to be increased respectively with the attendant technological difficulty of dealing with the three different signals.

To avoid these difficulties, embodiments of the present invention are directed to a technique of dividing a single transmit beam into two beams multiplexed into a single multiplexed receive signal. This approach allows the transmit and receive chains to remain unaltered and thus greatly simplifies the front- and back-end electronics. A functioning system requires only new quasioptical components to double the number of pixels as described hereafter. It should be noted that although embodiments of the invention are taught using two simultaneous transmit beams to range two image pixels simultaneously, those skilled in the art will appreciate that the principle may be expanded to any reasonable number of simultaneous transmit beams with each beam having a different time delay so that they may be safely multiplexed into a single receive signal.

Thus, embodiments of the invention are directed to a multipixel three-dimensional imaging radar operating at high frequency, e.g. 670 GHz, employing multiplexed radar signals in a multi-pixel heterodyne system using compact quasiquasioptical components. At such high frequencies, centimeter-scale spatial resolution in three dimensions is possible without excessively large fractional bandwidths or aperture sizes. The active target illumination inherent in radar ensures high signal power and provides for spectroscopic flexibility. A submillimeter imaging radar may use low phase-noise synthesizers and a fast microwave chirp-generator to produce a frequency-modulated continuous-wave (FMCW) waveform. Three-dimensional images are generated through range information derived for each pixel scanned over a target and employing a peak finding algorithm in processing for each pixel to differentiate material layers of the target. In addition, improved focusing may be achieved through a compensation signal sampled from a point source calibration target and applied to received signals from targets prior to FFT-based range compression to extract and display high-resolution target images. Such an imaging radar has particular application in detecting concealed weapons or contraband.

2. Multiplexed Transmit Beams for Multiple Simultaneous Pixels

In an exemplary radar imaging system, the transmit and receive signals are divided/combined by a hybrid coupler into two horns. The signal from one of the horns is focused by a reflector toward the target in order to deliver a first pixel (range information), while the second one is spatially delayed by a quasioptical waveguide and then focused with the same reflector in order to deliver a second pixel. The two pixels will have both a cross range and a temporal displacement. In the receive mode, this time delay will be translated into different IF frequencies, separating the information from the two pixels. The beam profiles of the two pixels can be tuned with the quasioptical system. For example, the two pixels can be designed to have a crossover of approximately −3 dB or instead be separated a certain number of beamwidths. It is also possible to direct both transmit at the same point on the target but with orthogonal polarizations in order to study polarization properties. Embodiments of the invention may also employ a combination of polarization and time delays to obtain a single multiplexed receive signal that can be processed to obtain the separate pixels information. The design of such quasioptical multiplexing can be performed in a single plane, and therefore may be used with a linear array.

Although embodiments of the invention may be applied to other radar imagers as will be understood by those skilled in the art, the active target illumination inherent in the example radar imager solves the problem of low signal power and narrow-band detection by using submillimeter heterodyne mixer receivers. A submillimeter imaging radar may use low phase-noise synthesizers and a fast chirper to generate a frequency-modulated continuous-wave (FMCW) waveform. Three-dimensional images are generated through range information derived for each pixel scanned over a target. A peak finding algorithm may be used in processing for each pixel to differentiate material layers of the target. Improved focusing is achieved through a compensation signal sampled from a point source calibration target and applied to received signals from active targets prior to FFT-based range compression to extract and display high-resolution target images. Such an imaging radar has particular application in detecting concealed weapons or contraband.

Figure 1A:
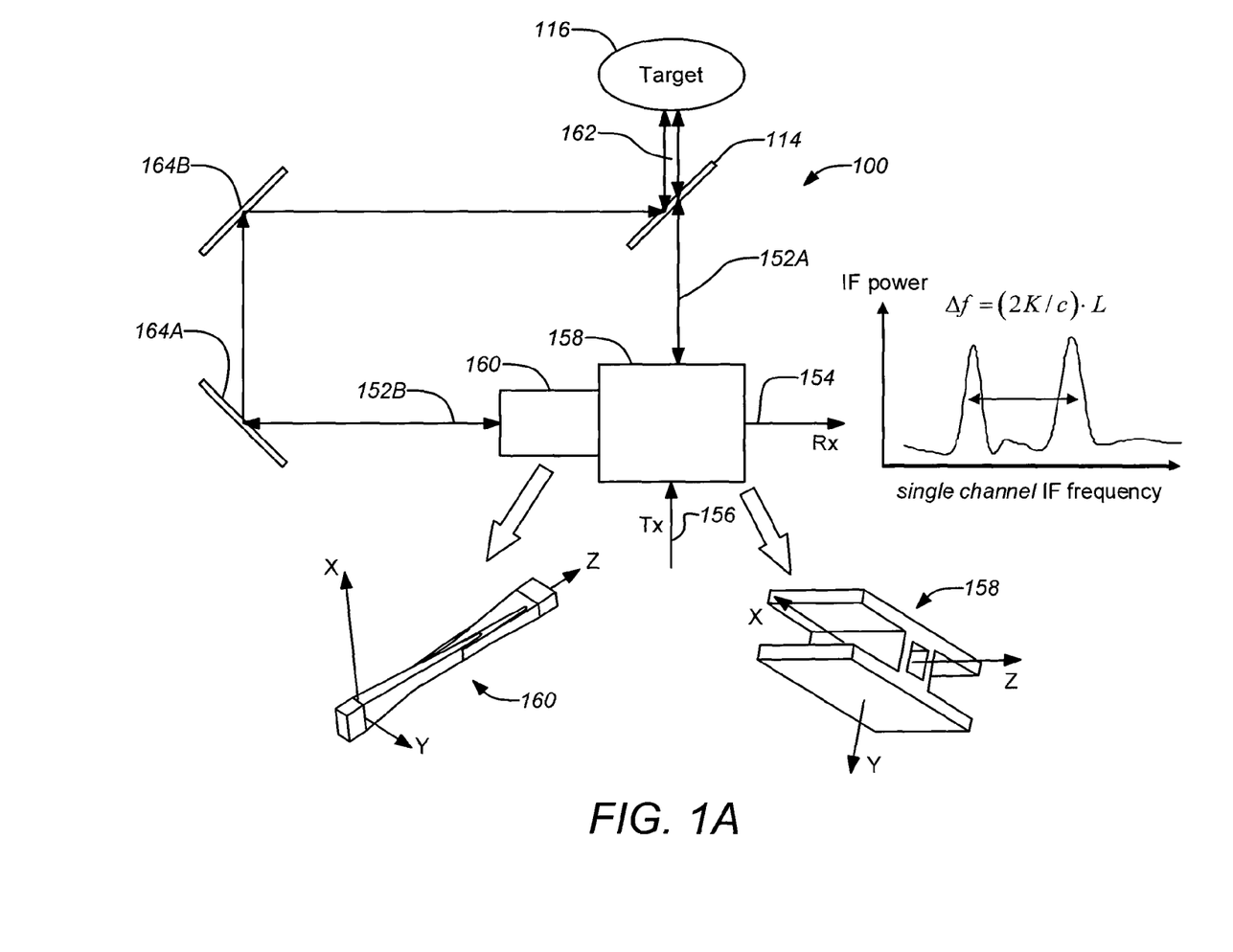
FIG. 1A is a block diagram of an exemplary apparatus for multiplexing a transmit beam in a radar imaging system embodiment of the invention.

FIG. 1A is a block diagram of an exemplary quasioptical device 100 for multiplexing a transmit beam in a radar imaging system 150 embodiment of the invention. The quasioptical device 100 comprises a coupler 158 for dividing the source transmit beam 156 into the first transmit beam 152A and the second transmit beam 152B. The second transmit beam 152B passes through a polarization twist waveguide 160 for rotating polarization of the second transmit beam 152B relative to that of the first transmit beam 152A. Additional quasioptical components are employed on the second transmit beam 152B to impart a path length differential in order to induce a time delay between the second transmit beam 152B and the first transmit beam 152A and for directing the first transmit beam and the second transmit beam to the target along a substantially parallel path with a spatial offset 162 between the two beams 152A, 152B. In this example, the path differential is developed with a pair of parabolic reflectors 164A, 164B (shown schematically) arranged to reflect and focus the second transmit beam 152B from the polarization twist waveguide 160 to bring it back to a polarizing wire grid 114. The first transmit beam 152A passes through the polarizing wire grid 114 from the coupler 158 and the second transmit beams 152B is reflected off the polarizing wire grid 114 to both be direct to the target 116 with a spatial offset 162 between the to co-aligned beams 152A, 152B. The beams 152A, 152B are reflected off the target 116 and return along their respective paths and through the coupler 158 to form a multiplexed received beam 154 in a single channel.

Thus, the quasioptical device 100 spatially offsets the second transmit beam 152B along a substantially parallel path from the first transmit beam 152A to a distinct point on the target 116 and time-delays the second transmit beam 152B from the first transmit beam 152A to correspond to a distinct IF frequency for demultiplexing and processing. Detailed examples of an applicable coupler 158 and polarization twist waveguide 160 are illustrated in FIG. 1A. However, those skilled in the art will appreciate that other combinations of quasioptical and/or waveguide components may be readily developed to appropriately divide and manipulate the transmit beam. Alternately, a variant of the quasioptical device 100 may be used to direct the first transmit beam 152A and the second transmit beam 152B along substantially collinear paths to the target with the second transmit beam 152B having a distinct polarization to that of the first transmit beam 152A for demultiplexing and processing.

It should be noted that the dividing component of the quasioptical device can be optical or waveguide as will be understood by those skilled in the art. A key element of the described technique is providing the delay between the two transmit beams. With current technology, this may be performed quasi-optically because a waveguide would probably be too lossy at these frequencies and at the necessary delay distances. It is also important to note that receiving the two reflected transmit beams as a single receive single means that a single receiver performs the detection; two receivers (i.e. mixers) combined to yield a single signal containing information from both beams would not provide much advantage. One advantage of the present technique is achieved because mixers at these frequencies are very costly. Thus, there is a strong motivation to use as few as possible.

The issue of ohmic loss in the system may be addressed by designing more compact waveguide components, possibly using silicon micro-machining. The isolation of the coupler, however, may be difficult to improve using any kind of waveguide design. Therefore, the SNR degradation due to phase noise may need to be addressed using a better RF circuit design, or just accepted as a moderate performance penalty. However, it is important to note that the same multiplexing technique described here could be implemented using all quasioptical components (e.g., beam splitter and polarization rotator), which would be practically immune to both the loss and leakage effects encountered in the all-waveguide duplexing approach. The waveguide approach has potential applicability to an eventual integrated array technology.

Figure 1B:
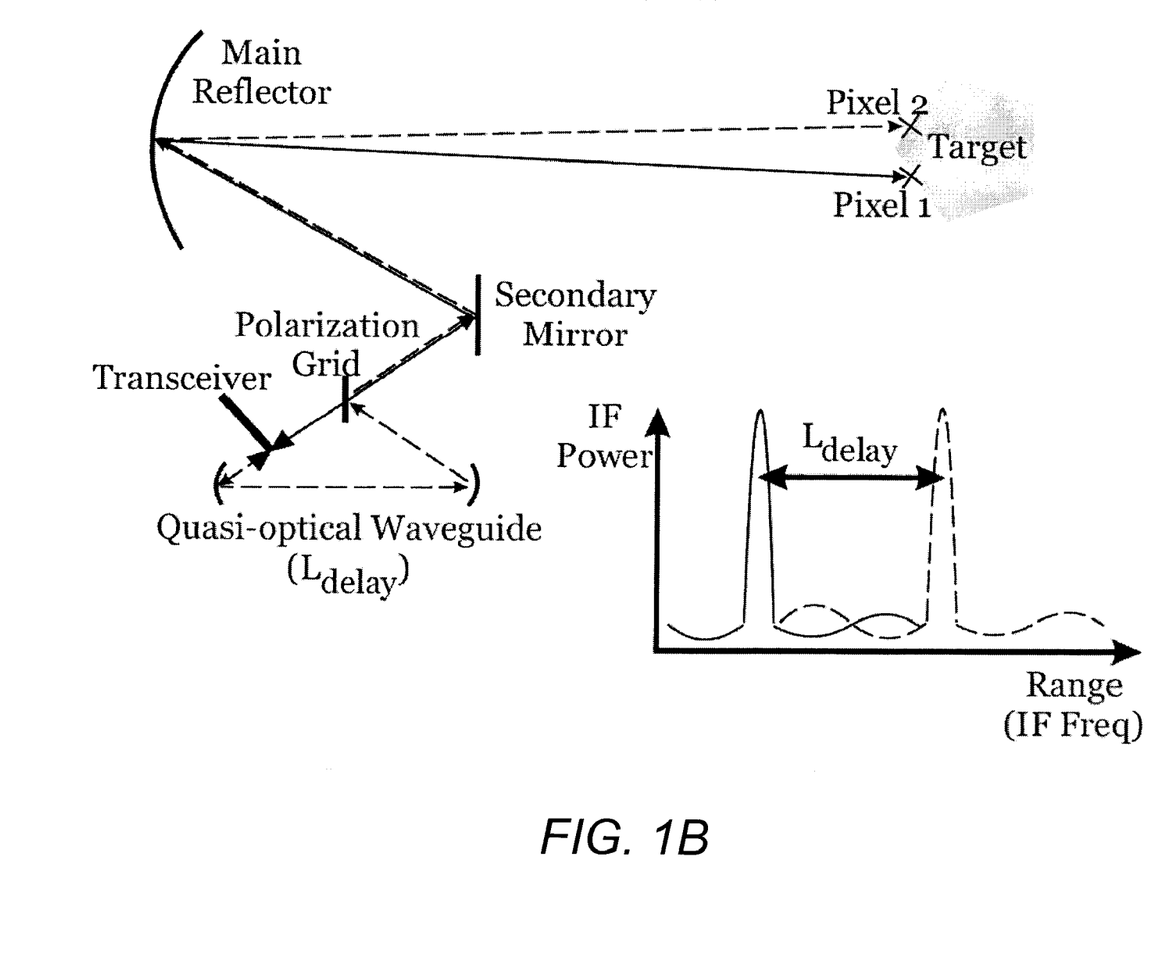
FIG. 1B is a diagram of another exemplary apparatus for multiplexing a transmit beam in a radar imaging system embodiment of the invention.

FIG. 1B is a diagram of another exemplary apparatus for multiplexing a transmit beam in a radar imaging system embodiment of the invention. The optical path of the first transmit beam, may follow from one of the coupler's horns through the wire grid that is oriented to be transparent to this first transmit beam, then to a secondary flat mirror, and finally to the main 40 cm ellipsoidal antenna which focuses the beam to a spot size of less than 1 cm at a target 4 m away. The second beam, on the other hand, is shown as a dashed line in FIG. 1B. After emerging from the second horn of the coupler/twist pair, it is first captured and delayed by a quasi-optical waveguide of length Ldelay=90 cm. Next, the second beam encounters the wire grid, but because of its orthogonal polarization with respect to the first beam, it is reflected by the grid. This is then followed by reflection from the common flat secondary mirror and ellipsoidal main mirror for focusing at 4 m range.

The exemplary beam multiplexing system is designed so that the first horn is offset in the focal plane by about 0.9 cm from the main antenna focal point, while the effective focal point of the quasi-optical waveguide matches that of the main antenna. The result is that the two beams are projected toward the target at a slightly offset angle of 0.61° in elevation, corresponding to a 4.25 cm displacement at the target range of 4 m. Thus, while the two beams share a common source and detector, they are separated both in the two-dimensional cross-range space of the target focal plane and in the third range dimension by virtue of the time delay of the second beam. This means that even though both beams may be reflected by separate regions of a target at the roughly same range from the main reflector, the detected signals of the two beams will be separated by a distance $L_{delay}$ in the final IF power spectrum. In other words, the power spectrum of the detected IF signal will generally exhibit two regions of high intensity, corresponding to the two beams, separated by a range corresponding to the time delay introduced in the second beam, as indicated inset of FIG. 1B. The peaks in the power spectrum can then be assigned with high reliability to the appropriate beam for image reconstruction. Thus three-dimensional target information can be acquired from two beams simultaneously, all without any additional THz sources, receivers, or analog-to-digital sampling channels.

Figure 1C:
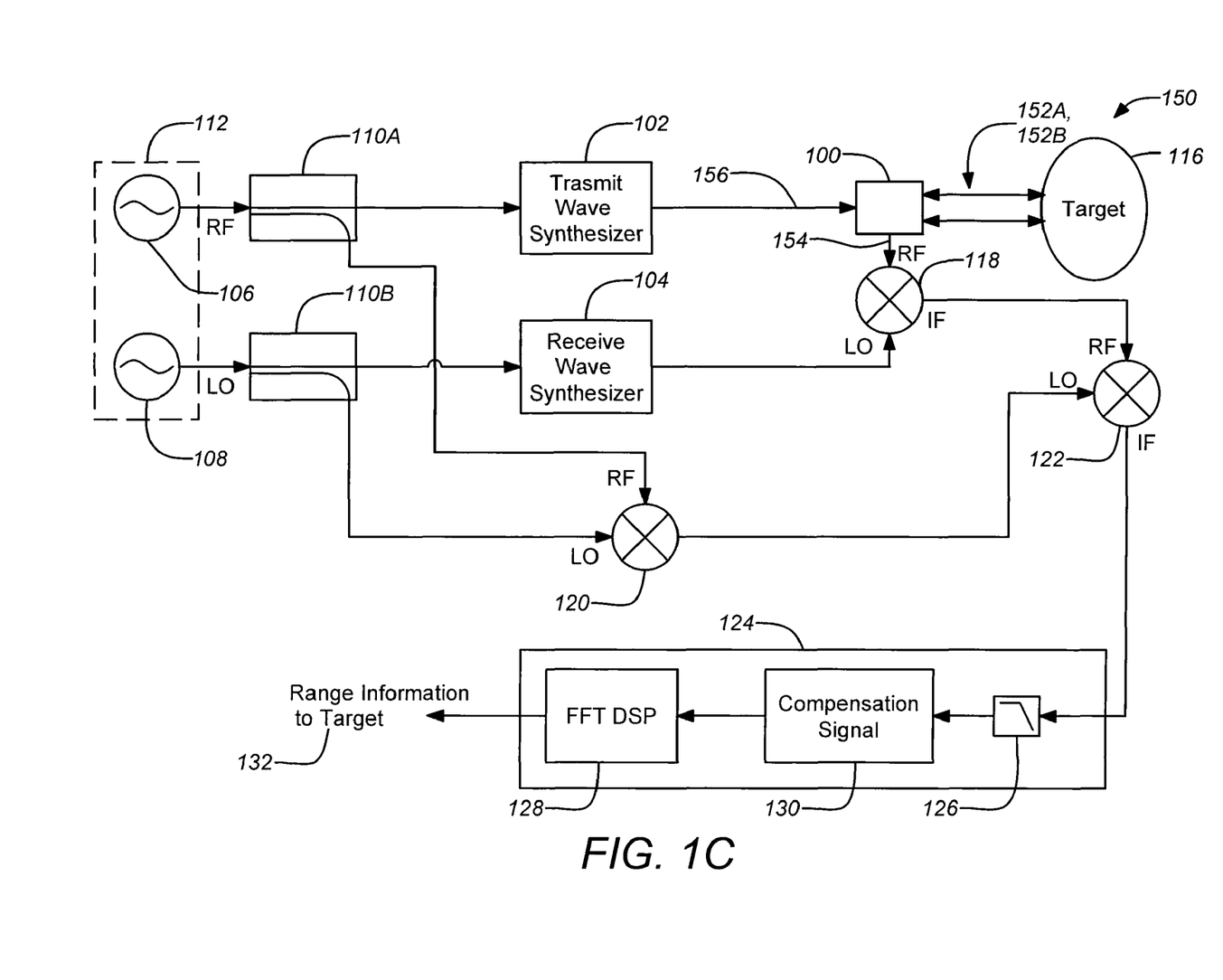
FIG. 1C is a block diagram of an exemplary three dimensional imaging radar system embodiment of the invention which may be employed with multiplexing transmit beam.

FIG. 1C is a block diagram of an exemplary three dimensional imaging radar system 150 that may employ a embodiment of the invention. This simplified diagram eliminates necessary frequency multipliers and amplifiers to better illustrate general function of the radar. Location and type of filters, frequency multipliers and amplifiers are variable and depend upon a particular system design as will be understood by those skilled in the art. Detailed examples of three-dimensional imaging radar that are operable with embodiments of the invention are described in U.S. patent application Ser. No. 12/135,040 previously mentioned. In general, an applicable imaging system 150 employs a transmit wave synthesizer 102 for generating a frequency modulated continuous wave (FMCW) chirp signal as the source transmit beam 156 based on a source signal. The final FMCW chirp signal is smoothly chirped in frequency over a wide bandwidth and output at high frequency, e.g. 560 GHz. A receive wave synthesizer 104 generates a FMCW local oscillator chirp signal from a source local oscillator (LO) signal. Note that the transmit wave synthesizer 102 and the receive wave synthesizer 104 may be combined in a single device. The source signal and the source LO signal may be generated through different techniques, e.g. from separate waveform generators 106, 108 or a common waveform generator unit 112, as will be described hereafter.

The output FMCW chirp signal source transmit beam 156 is divided into two transmit beams 152A, 152B directed to the target 116 by the appropriate quasioptical device 100. The FMCW chirp signal transmit beams 152A, 152B are reflected off the target 116 and return to a first mixer 118 as a multiplexed receive signal 154 in a single channel to be combined with a FMCW local oscillator chirp signal from the receive wave synthesizer 104 and yield a first intermediate frequency (IF) signal for each transmit beam 152A, 152B. The induced time delay from the path differential of the second transmit beam 152B imparts distinct IF frequency which differentiates the two power peaks in the single receive channel for each pixel as illustrated in the inset graph of FIG. 1A. Both the source signal 106 and the source LO signal 108 are tapped (at signal taps 110A, 110B, respectively) and mixed in a second mixer 120 to yield a second IF signal. A third mixer 122 is then used to combine the first IF signal and the second IF signal to generate a final IF signal for each of the first transmit beam 152A and the second transmit beam 152B.

Processing may be performed by a digital signal processor system 124 which digitizes 126 the final IF signal and performs fast Fourier transform (FFT) processing 128 on the digitized final IF signal to determine range information 132 for the target 116 for each of the simultaneous transmit beams 152A, 152B. The present invention may also employ a compensation signal 130 derived from a point source test target response which is applied to the final IF signal prior to FFT processing 128 for each beam 152A, 152B to focus the determined range information 132 for the target 116. Details of the operations and processes of an applicable imaging radar are described in related U.S. patent application Ser. No. 12/135, 040 in various example embodiments of the invention.

For scanned three-dimensional imaging applications, it may be very helpful to increase the PRF by building a custom chirped source that is fast, linear, and wideband. These requirements are conflicting because of the tradeoff between speed and phase noise, but such systems have already been developed for some specialized FMCW radars. See e.g., Gogineni et al., "An Ultra-wideband Radar for Measurements of Snow Thickness Over Sea Ice," Proceedings of the IGARSS '03. IEEE Geoscience and Remote Sensing Symposium, vol. 4, pp. 2802-2804, 21-25 Jul., 2003, which is incorporated by reference herein. Indeed, phase noise and chirp nonlinearities in submillimeter radars may be likely to pose severe constraints as target distances increase and clutter and multipath signals appear. See e.g., Wehner, "High-Resolution Radar," Artech House, Boston 1995, which is incorporated by reference herein. Nonetheless, based on the results presented herein, the component technology and signal processing algorithms are advanced enough to make submillimeter radar viable.

Figure 2:
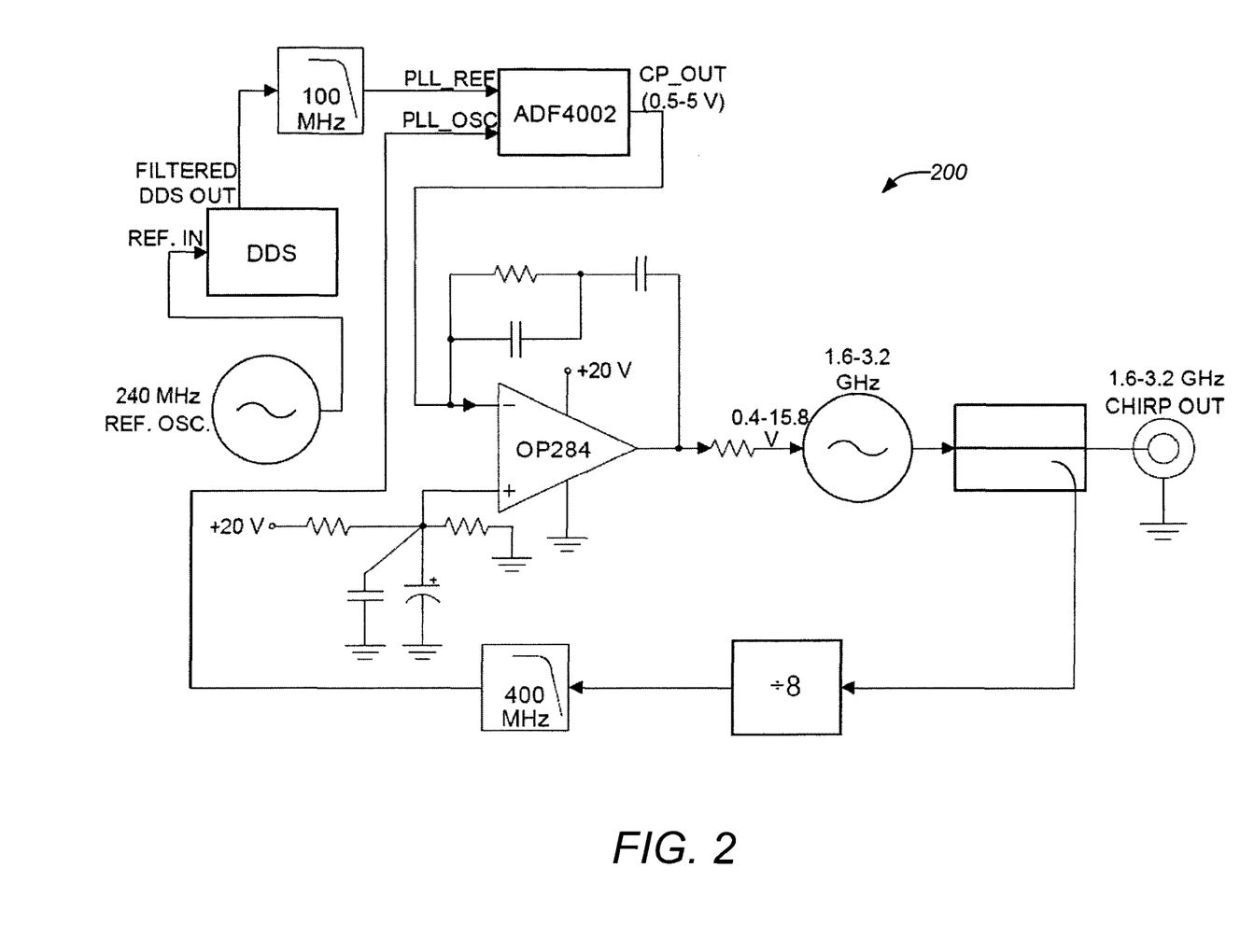
FIG. 2 is a block diagram of an exemplary chirp source for an embodiment of the invention.

FIG. 2 is a block diagram of an exemplary chirp source 200 for an embodiment of the invention. This chirp source 200 may be readily implemented in to the example radar system 150 of FIG. 1C as will be understood by those skilled in the art. The chirp speed may limited in part by the signal to noise ratio of the system. If a high multiplication ratio used (×36), the primary factor limiting the dynamic range is not the receiver noise figure or lack of transmitter power, but phase noise in the transmitted and LO signals. In order to reduce this noise, a lower multiplication factor of ×18 may be chosen. In order to generate the base chirp signals, a pair of very low noise 35 GHz synthesizers, e.g. Miteq synthesizers, may be employed. These synthesizers may then be used to upconvert a new chirp source. A lower multiplication factor will raise the required bandwidth of the chirper. For ×18 multiplication and 29 GHz chirp bandwidth, a base chirp bandwidth of ~1.6 GHz is required. Additionally, in order to keep the wide band phase noise contribution from the chirp source as low as possible, the lowest possible frequency range that still yielded a 1.6 GHz chirp band may be chosen. A Mini-Circuits ROS-3200-419+ may be selected as the VCO for the chirper due to its low cost, wide full-octave bandwidth and low operating frequency. Its phase noise at frequency offsets above 1 MHz is 15 to 20 dB lower than higher frequency wideband VCOs.

While reduced phase noise is important to improving the signal to noise ratio, this reduced noise must be maintained while chirping at a fast rate. In order to ultimately achieve near real-time imaging speeds using a reasonably small number of parallel transceiver channels, a single chirped pulse must be acquired in 1 millisecond or less. This represents a factor of 12 decrease in chirp duration over a high multiplication factor chirper, with a chirp rate of roughly double the increase in duration due to the halving of the base source multiplication factor. For example, the chirp source in such a system may run at approximately 0.064 MHz/µsec chirp rate, the chirper 200 of FIG. 2 may operate at approximately 1.6 MHz/µsec. These requirements can be achieved using the example hybrid PLL/DDS design shown in FIG. 2. The 1.6-3.2 GHz chirper may be designed using vendor-assembled evaluation boards for the VCO, DDS, microwave divider and phase detector/PLL. The DDS board reference may be driven from the same ultra low-noise 240 MHz reference oscillator feeding the Miteq synthesizers in order to obtain the lowest possible phase noise output from the DDS, which was used as the reference input for the PLL section. The phase detector/PLL device chosen, an Analog Devices ADF4002 has a very low normalized phase noise floor (−222 dBc/Hz). Since the example VCO requires a tuning voltage of 0-20 V while the charge pump output from the ADF4002's phase detector only supplies 5 V, an active loop filter can be designed using SimPLL. In addition to providing the DC gain required to drive the VCO's tuning input across its entire range, the loop filter may be optimized for low phase noise while maintaining sufficient loop bandwidth to maintain phase lock during chirping. As previously mentioned, it is critical that a chirp source maintain good phase noise performance while actually chirping.

Figure 3:
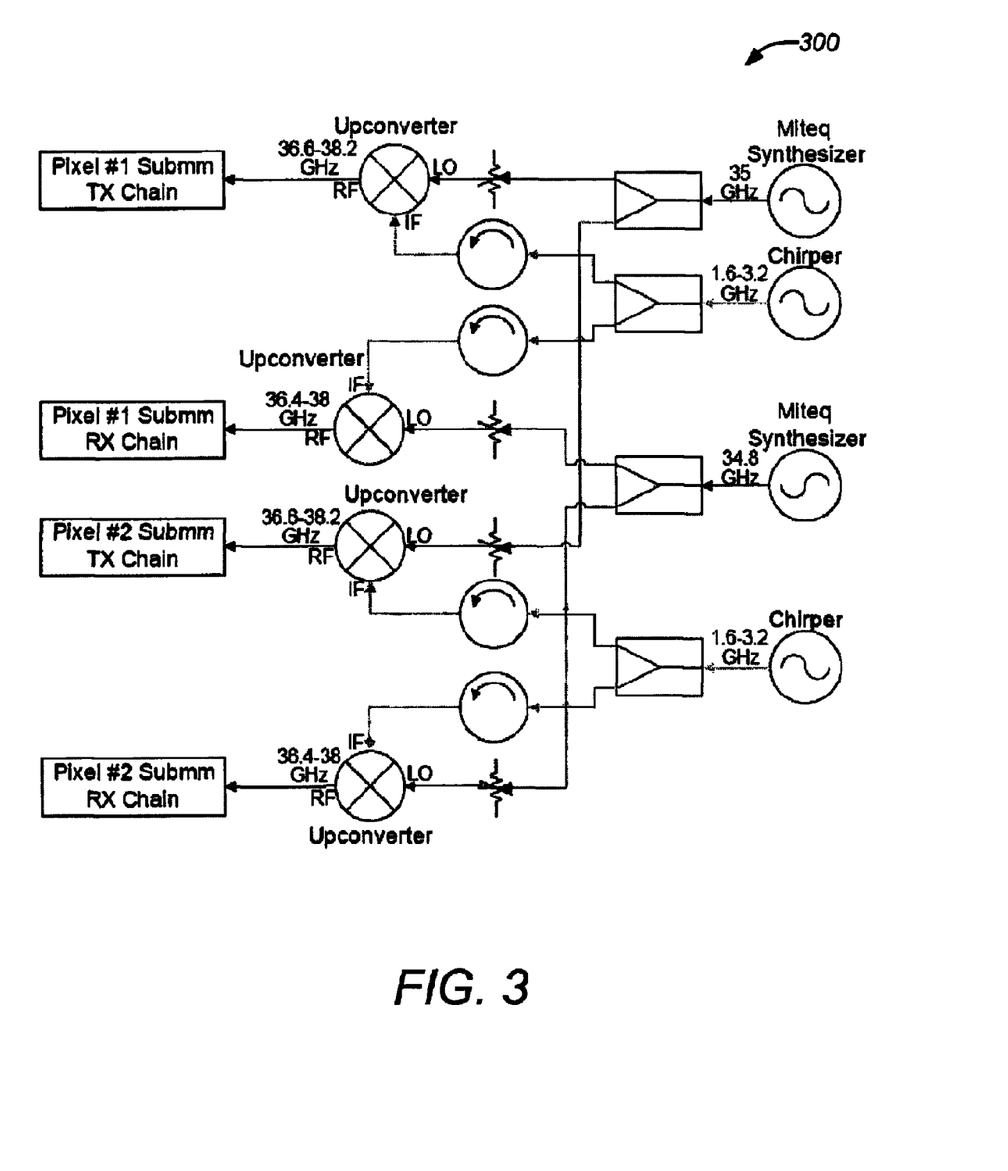
FIG. 3 is a block diagram of an exemplary base signal source for a two-pixel imaging embodiment of the invention.

FIG. 3 is a block diagram of an exemplary base signal source 300 for a two-pixel imaging embodiment of the invention. Additional transceiving elements can decrease the image acquisition time without decreasing individual pixel acquisition time. Although adding a second pixel to the system doubles the amount of submillimeter components required, some savings in microwave hardware can be realized by using a common low noise source. In FIG. 3 the low noise transmit and LO synthesizer signals are divided and sent to both pixels, while each pixel maintains its own chirp source 200. By applying an asynchronous chirp signal generated by independent chirpers to each pixel, cross coupling between the pixels may be completely eliminated. This has the added benefit of eliminating an undesired modulation problem within the base signal generating subsystem: the power dividers fed by each synthesizer have limited isolation, allowing mixing products from one upconverter to leak out of its LO input and back into the LO input of the other pixel's upconverter. When the chirps for each pixel are temporally correlated, this leakage may cause subtle phase and amplitude shifts in the base transmit signals at the output of the upconverters, leading to loss of range resolution caused by "smearing" of the demodulated spectrum. By decorrelating the two chirp signals, these products fall outside the final IF range of the receivers. Although additional isolators at the outputs of the power dividers may also remedy this problem, the use of independent asynchronous chirpers for each pixel affords the additional benefit of eliminating any cross coupling between the beam patterns of closely spaced pixels (the two pixels in the example system are separated by about 183 dB beamwidths, corresponding to 10 cm at 4 m standoff distance, so this is not an issue in the example). Since proper detection requires that the LO chirp be phase matched to the transmit signal, each chirper is able to supply signal for both the transmit and LO upconverters for its associated pixel. Low cost 1.5-3.5 GHz isolators on the chirper power divider outputs prevent cross coupling between the IF ports of the transmit and LO upconverters.

Figure 4:
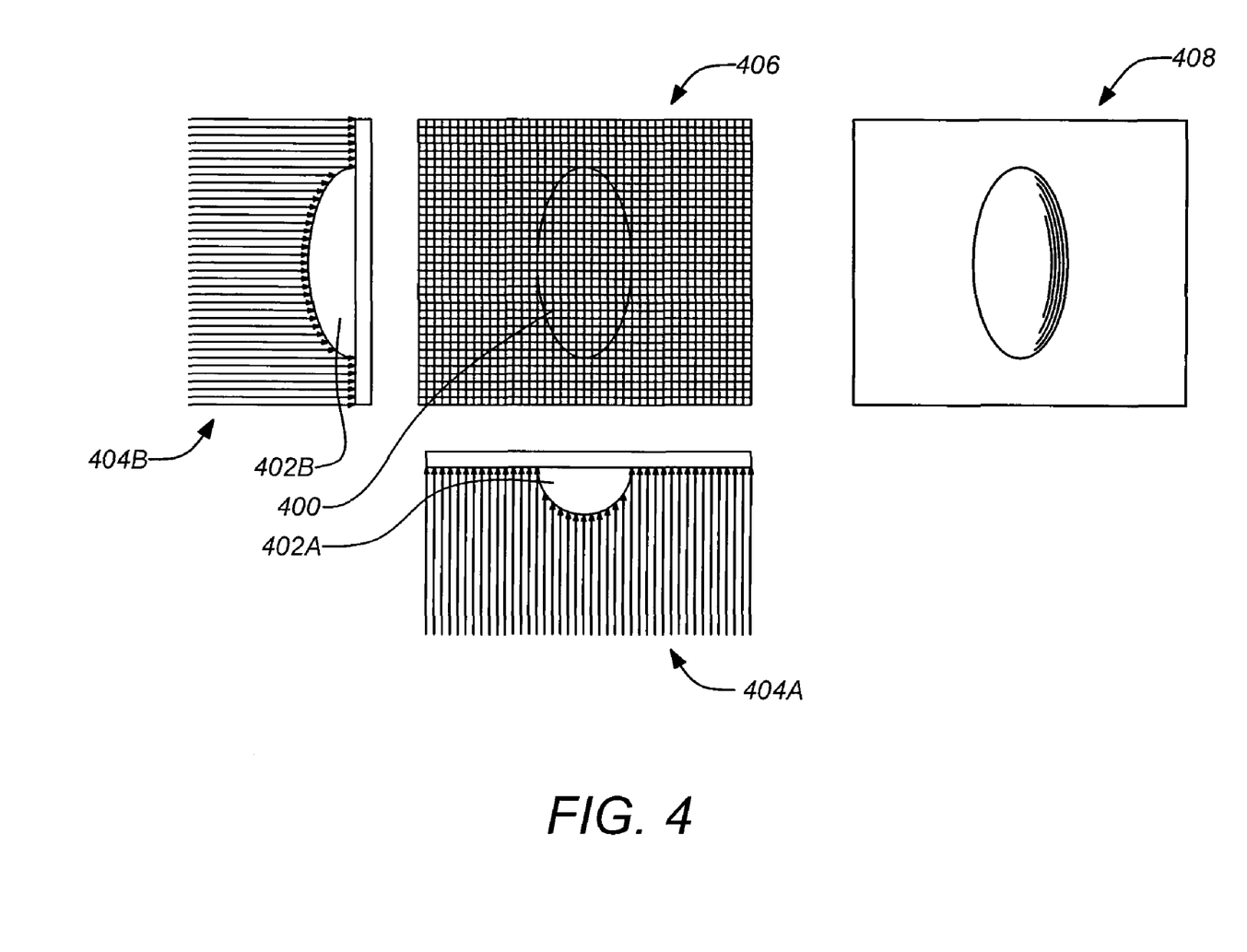
FIG. 4 illustrates a scanning process that may be applied by the example system to derive three-dimensional images of a target with multiplexed transmit beams to yield multiple simultaneous pixels.

FIG. 4 illustrates a scanning process that may be applied by the example system 150 to derive three-dimensional images of a target with multiplexed transmit beams to yield multiple simultaneous pixels. Using any known suitable beam scanning technique, the multiple transmit beams from the radar system 150 are directed to different points on the target 400. Cross sections for a side view 402B, and a top view 402C maximum of the target show the separate transmitted beams 404A, 404B along these planes directed to the target 400 at multiple points. Range information is derived for each of the scanned points (i.e., each intersection of the grid projected over the entire front view 406). The range information for each point corresponds to a pixel of the resulting three-dimensional image 408.

Figure 5A:
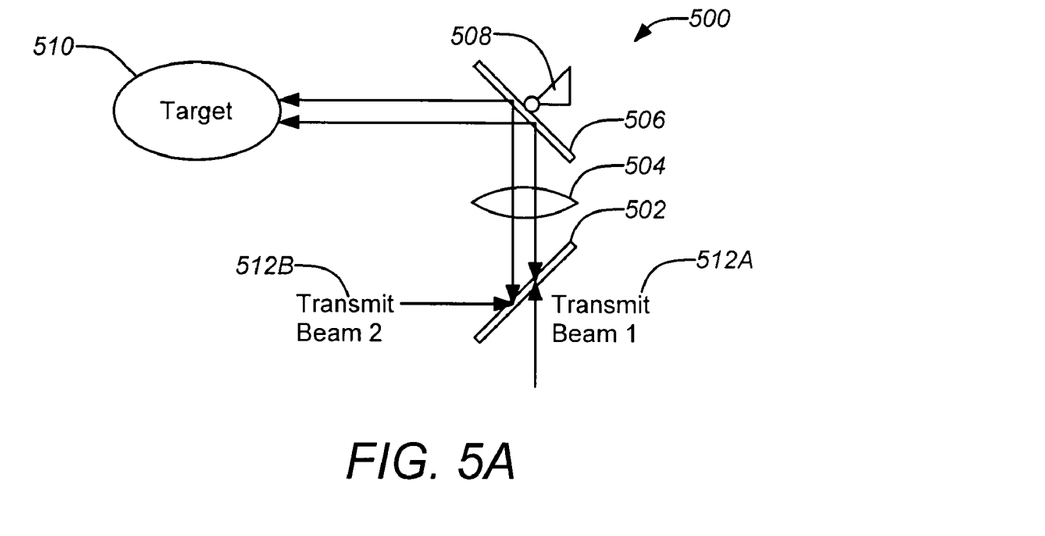
FIGS. 5A and 5B illustrate beam diagrams of a beamsplitter and lens quasioptical device and a two-axis rotation stage quasioptical device for an exemplary three-dimensional imaging radar system.
Figure 5B:
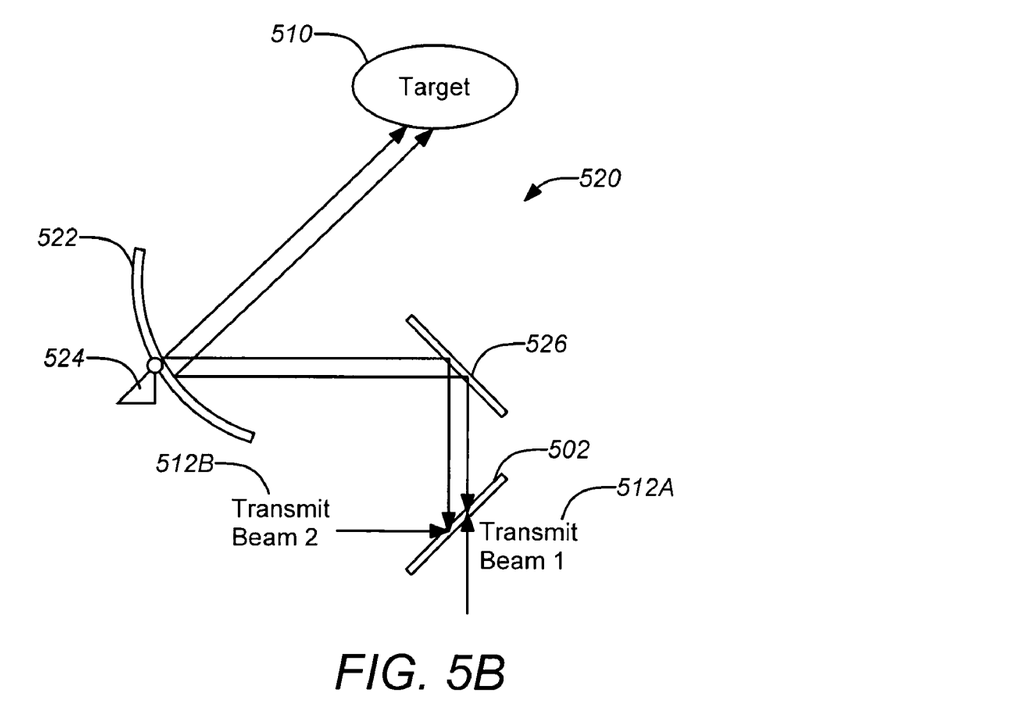

FIGS. 5A and 5B illustrate beam diagrams of some exemplary quasioptical devices 100 that can be used to direct the two transmit beams of the imaging radar system 150 to scan over points of the target 116 as previously described in reference to FIGS. 1A to 1C. FIG. 5A is a beam diagram of a flat mirror quasioptical device 500 where the submillimeter power transmit beams 512A, 512B are co-aligned at a polarizing wire grid 502 and then directed to a plano-convex lens 504 (e.g., comprising Teflon with a diameter of 20 cm). This lens 504 focuses the two THz transmit beams 512A, 512B to two separate spots, e.g. approximately 2 cm at a standoff range of 4 m. To achieve scanned images, a flat mirror 506 on a two-axis rotational stage 508 is manipulated to deflect the transmit beams 512A, 512B together in the desired direction to scan over the target 510 as previously described. FIG. 5B is a beam diagram of an ellipsoidal reflector quasioptical device 520 for the exemplary three-dimensional imaging radar system 150. Beam focusing and scanning can alternately be accomplished by an aluminum off-axis ellipsoidal reflector 522 mounted on a two-axis rotation stage 524. Using a precision-machined reflector 522 (e.g., a 40 cm diameter reflector) instead of a refractive Teflon plano-convex lens 504 can boost the quasioptical efficiency by approximately 8 dB, due to lower absorption loss and the elimination of reflection loss from the approximately 2 cm thick dielectric lens. See Benford et al., "Optical properties of Zitex in the infrared to submillimeter," Applied Optics, vol. 42, no. 25, pp. 5118-5122, Sep. 2003. In addition, clutter resulting from the lens backscattering may be eliminated. Upon leaving the transceiver the first null beamwidth is approximately 28°. A secondary mirror 526 may be used to deflect the transmit beams 512A, 512B to the ellipsoidal reflector 522, which focuses the transmit beams 512A, 512B at 4 meters standoff (fixed by the mirror focal length) with a half power width of approximately 0.6 cm. Owing to the two-way nature of the transceiver, the effective 3 dB cross-range resolution is about 0.4 cm.

Figure 6:
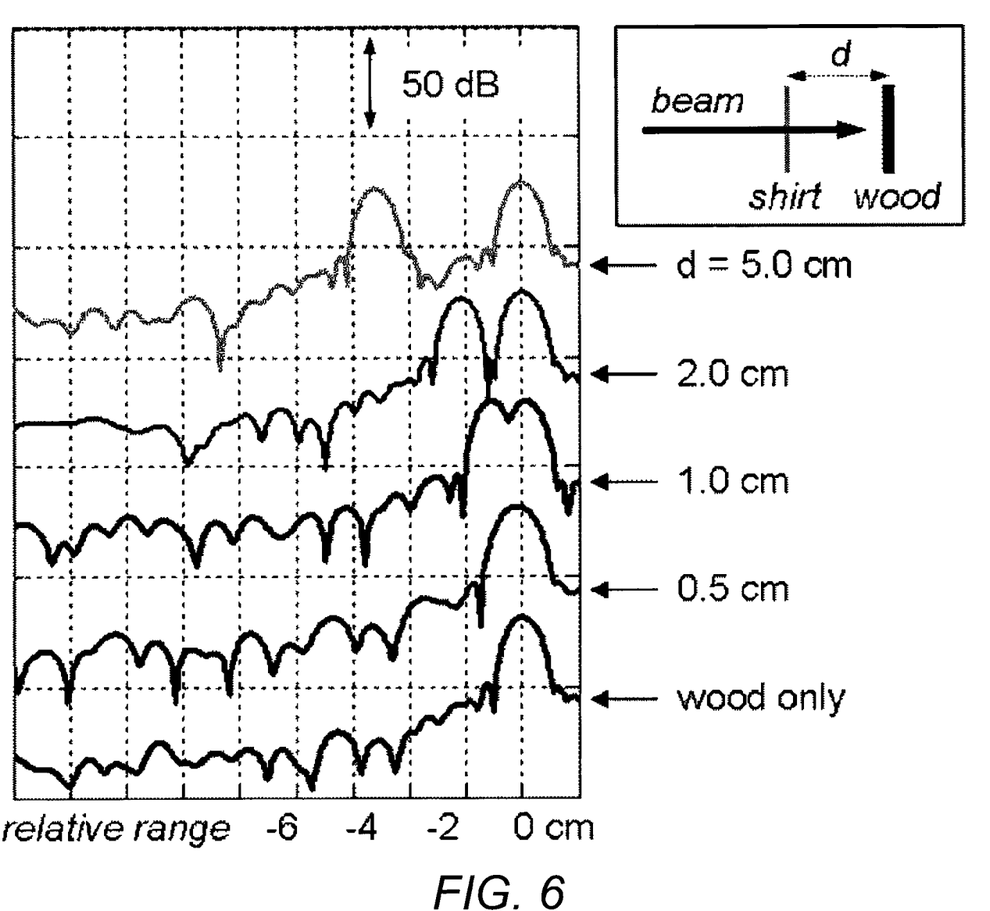
FIG. 6 illustrates results of an imaging scan of a target configuration relevant to a concealed weapon scenario where reflection off the shirt and that off the masked wood surface can be distinguished from each other for separations of 1 cm or more.

FIG. 6 illustrates results of an imaging scan of a target configuration relevant to a concealed weapon scenario. Although the presented data is from a radar imaging employing a single 1 transmit beam it illustrates a radar imaging process which may benefit from multiplexed transmit beams to obtain two simultaneous pixels previously described as will be understood by those skilled in the art. To assess the range resolution capabilities of an example 600 GHz imaging radar, a target was used that is relevant to through-garment imaging. Fabric from a cotton T-shirt was stretched flat and positioned a short distance in front of a wooden board as illustrated in the inset. The shirt and wood were placed approximately perpendicular to the radar beam at a 4 m standoff range. The beam can penetrate the shirt very easily, while the wood is opaque. The imager's range resolution for this scenario is defined as the minimum distance between the shirt and wood such that the radar can still distinguish between the two. FIG. 6 shows the range-compressed power spectra obtained with the 600 GHz radar for four different shirt-wood separations between 0.5 and 5.0 cm, in addition to the wood only spectrum. These data indicate that at 0.5 cm separation, which is the theoretical bandwidth-limited range resolution, there is a broadening of the radar return, but still only one peak is evident. However, by 1 cm separation, two peaks can clearly be discerned with a contrast of about 8 dB. Thus, the practical range resolution of the 600 GHz radar is around 1 m, about twice the 28.8 GHz bandwidth-limited value. The causes of this reduction in resolution are the use of a Hanning window in the power spectrum calculation (i.e., applying the compensation signal), which increases the point-target spectral width by about 60%, and residual uncompensated FMCW ramp nonlinearities.

3. Method of Three Dimensional Imaging

Figure 7:
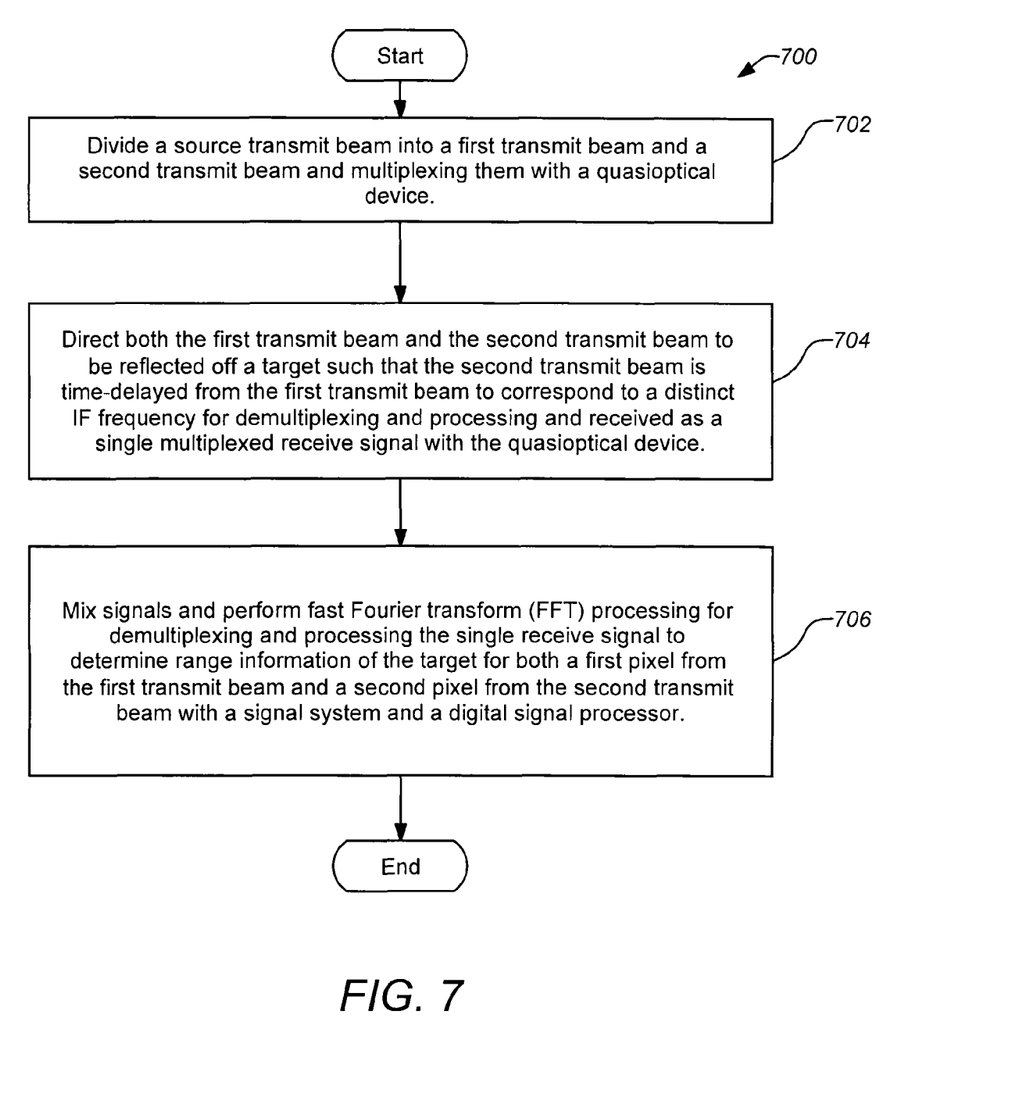
FIG. 7 is a flowchart of an exemplary method of radar imaging.

FIG. 7 is a flowchart of an exemplary method 700 of radar imaging. The method 700 begins with an operation 702 of dividing a source transmit beam into a first transmit beam and a second transmit beam and multiplexing them with a quasioptical device. In operation 704, both the first transmit beam and the second transmit beam are directed to be reflected off a target such that the second transmit beam is time-delayed from the first transmit beam to correspond to a distinct IF frequency for demultiplexing and processing and received as a single multiplexed receive signal with the quasioptical device. Finally, in operation 706 signals are mixed and a fast Fourier transform (FFT) processing is performed for demultiplexing and processing the single multiplexed receive signal to determine range information of the target for both a first pixel from the first transmit beam and a second pixel from the second transmit beam with a signal system and a digital signal processor. The method 900 may be further modified consistent with the system embodiments previously described.

In a radar imaging process employing a frequency modulated continuous wave (FMCW) chirp signal, signal mixing and performing FFT processing may be performed by generating the source transmit beam with a first wave synthesizer, where the source transmit beam comprises a FMCW chirp signal from a source signal. An FMCW local oscillator chirp signal is generated from a source local oscillator signal using a second wave synthesizer. The reflected FMCW chirp signal and the FMCW local oscillator chirp signal are then combined to generate a first intermediate frequency (IF) signal for each of the first transmit beam and the second transmit beam using a first mixer. The source signal and the source local oscillator signal are then combined to generate a second IF signal using a second mixer. The first IF signal and the second IF signal are combined to generate a final IF signal for each of the first transmit beam and the second transmit beam using a third mixer. The digital signal processor performs fast Fourier transform (FFT) processing the final IF signal for each of the first transmit beam and the second transmit beam to determine range information for the target of both a first pixel from the first transmit beam and a second pixel from the second transmit beam.

Imaging performance may be improved when a common chirp signal is generated in 1 millisecond or less with a waveform generator. The first wave synthesizer generates the frequency modulated continuous wave (FMCW) chirp signal from the source signal mixed with the common chirp signal and the second wave synthesizer generates the FMCW local oscillator chirp signal from the source local oscillator signal mixed with the common chirp signal.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A radar imaging system, comprising:
    a quasioptical device for dividing a source transmit beam into a first transmit beam and a second transmit beam and multiplexing them, where both the first transmit beam and the second transmit beam are directed to be reflected off a target such that the second transmit beam is time-delayed from the first transmit beam to correspond to a distinct IF frequency for demultiplexing and processing and received as a single multiplexed receive signal with the quasioptical device; and
    a system for signal mixing and a digital signal processor for performing fast Fourier transform (FFT) processing for demultiplexing and processing the single multiplexed receive signal to determine range information of the target for both a first pixel from the first transmit beam and a second pixel from the second transmit beam.

2. The radar imaging system of claim 1, wherein the system for mixing comprises a first wave synthesizer for generating the source transmit beam, the source transmit beam comprising a frequency modulated continuous wave (FMCW) chirp signal from a source signal;
    a second wave synthesizer for generating a FMCW local oscillator chirp signal from a source local oscillator signal;
    a first mixer for combining the reflected FMCW chirp signal and the FMCW local oscillator chirp signal to generate a first intermediate frequency (IF) signal for each of the first transmit beam and the second transmit beam;
    a second mixer for combining the source signal and the source local oscillator signal to generate a second IF signal; and
    a third mixer for combining the first IF signal and the second IF signal to generate a final IF signal for each of the first transmit beam and the second transmit beam;

wherein the digital signal processor performs fast Fourier transform (FFT) processing the final IF signal for each of the first transmit beam and the second transmit beam to determine range information for the target of both a first pixel from the first transmit beam and a second pixel from the second transmit beam.

3. The radar imaging system of claim 2, further comprising a waveform generator generating a common chirp signal in 1 millisecond or less;
wherein the first wave synthesizer generates the frequency modulated continuous wave (FMCW) chirp signal from the source signal mixed with the common chirp signal and the second wave synthesizer generates the FMCW local oscillator chirp signal from the source local oscillator signal mixed with the common chirp signal.

4. The radar imaging system of claim 1, wherein the quasioptical device spatially offsets the second transmit beam along a substantially parallel path from the first transmit beam to a distinct point on the target.

5. The radar imaging system of claim 1, wherein the quasioptical device directs the first transmit beam and the second transmit beam along substantially collinear paths and polarizes the second transmit beam to that of the first transmit beam to correspond to a distinct polarization for demultiplexing and processing.

6. The radar imaging system of claim 1, wherein the quasioptical device comprises a coupler for dividing the source transmit beam into the first transmit beam and the second transmit beam;
a polarization twist waveguide for rotating polarization of the second transmit beam relative to that of the first transmit beam; and
quasioptical components for imparting a path length differential to induce a time delay between the second transmit beam and the first transmit beam and for directing the first transmit beam and the second transmit beam to the target along a substantially parallel path with a spatial offset.

7. The radar imaging system of claim 1, wherein a three dimensional map of the target is derived from the range information determined for each of multiple pixels scanned over the target, where the range information for the multiple pixels are determined in simultaneously processed pairs associated with the first transmit beam and the second transmit beam.

8. The radar imaging system of claim 7, wherein a peak-finding algorithm is applied to the determined range information to differentiate material layers of the target.

9. The radar imaging system of claim 7, wherein the quasioptical device comprises a reflector coupled to a two-axis rotation stage and the range information is determined by positioning the two-axis rotation stage for each of the pairs of the multiple pixels scanned over the target with the reflector directing the FMCW chirp signal from the reflector to be reflected off the target and received from the target.

10. A method of radar imaging, comprising:
dividing a source transmit beam into a first transmit beam and a second transmit beam and multiplexing them with a quasioptical device;
directing both the first transmit beam and the second transmit beam to be reflected off a target such that the second transmit beam is time-delayed from the first transmit beam to correspond to a distinct IF frequency for demultiplexing and processing and received as a single multiplexed receive signal with the quasioptical device; and
signal mixing and performing fast Fourier transform (FFT) processing for demultiplexing and processing the single multiplexed receive signal to determine range information of the target for both a first pixel from the first transmit beam and a second pixel from the second transmit beam with a signal system and a digital signal processor.

11. The method of claim 10, wherein signal mixing and performing FFT processing comprises:
generating the source transmit beam with a first wave synthesizer, the source transmit beam comprising a frequency modulated continuous wave (FMCW) chirp signal from a source signal;
generating a FMCW local oscillator chirp signal from a source local oscillator signal using a second wave synthesizer;
combining the reflected FMCW chirp signal and the FMCW local oscillator chirp signal to generate a first intermediate frequency (IF) signal for each of the first transmit beam and the second transmit beam using a first mixer;
combining the source signal and the source local oscillator signal to generate a second IF signal using a second mixer; and
combining the first IF signal and the second IF signal to generate a final IF signal for each of the first transmit beam and the second transmit beam using a third mixer;
wherein the digital signal processor performs fast Fourier transform (FFT) processing the final IF signal for each of the first transmit beam and the second transmit beam to determine range information for the target of both a first pixel from the first transmit beam and a second pixel from the second transmit beam.

12. The method of claim 11, further comprising generating a common chirp signal in 1 millisecond or less with a waveform generator;
wherein the first wave synthesizer generates the frequency modulated continuous wave (FMCW) chirp signal from the source signal mixed with the common chirp signal and the second wave synthesizer generates the FMCW local oscillator chirp signal from the source local oscillator signal mixed with the common chirp signal.

13. The method of claim 10, wherein the quasioptical device spatially offsets the second transmit beam along a substantially parallel path from the first transmit beam to a distinct point on the target.

14. The method of claim 10, wherein the quasioptical device directs the first transmit beam and the second transmit beam along substantially collinear paths and polarizes the second transmit beam to that of the first transmit beam to correspond to a distinct polarization for demultiplexing and processing.

15. The method of claim 10, wherein the quasioptical device comprises a coupler for dividing the source transmit beam into the first transmit beam and the second transmit beam;
a polarization twist waveguide for rotating polarization of the second transmit beam relative to that of the first transmit beam; and
quasioptical components for imparting a path length differential to induce a time delay between the second transmit beam and the first transmit beam and for directing the first transmit beam and the second transmit beam to the target along a substantially parallel path with a spatial offset.

16. The method of claim 10, wherein a three dimensional map of the target is derived from the range information determined for each of multiple pixels scanned over the target, where the range information for the multiple pixels are determined in simultaneously processed pairs associated with the first transmit beam and the second transmit beam.

17. The method of claim 16, wherein a peak-finding algorithm is applied to the determined range information to differentiate material layers of the target.

18. The method of claim 16, wherein the quasioptical device comprises a reflector coupled to a two-axis rotation stage and the range information is determined by positioning the two-axis rotation stage for each of the pairs of the multiple pixels scanned over the target with the reflector directing the FMCW chirp signal from the reflector to be reflected off the target and received from the target.

19. An apparatus for multiplexing in a radar imaging system, comprising:
   a coupler for dividing the source transmit beam into a first transmit beam and a second transmit beam and multiplexing them;
   a polarization twist waveguide for rotating polarization of the second transmit beam relative to that of the first transmit beam;
   quasioptical components for imparting a path length differential to induce a time delay between the second transmit beam and the first transmit beam and for directing the first transmit beam and the second transmit beam to the target along a substantially parallel path with a spatial offset;
   wherein both the first transmit beam and the second transmit beam are directed to be reflected off a target and received as a single multiplexed receive signal by the quasioptical device and the single multiplexed receive signal is demultiplexed and processed to determine range information of the target for both a first pixel from the first transmit beam and a second pixel from the second transmit beam.

20. The apparatus of claim 19, wherein the source transmit beam comprises a frequency modulated continuous wave (FMCW) chirp signal.

\* \* \* \* \*